UNITED STATES PATENT OFFICE.

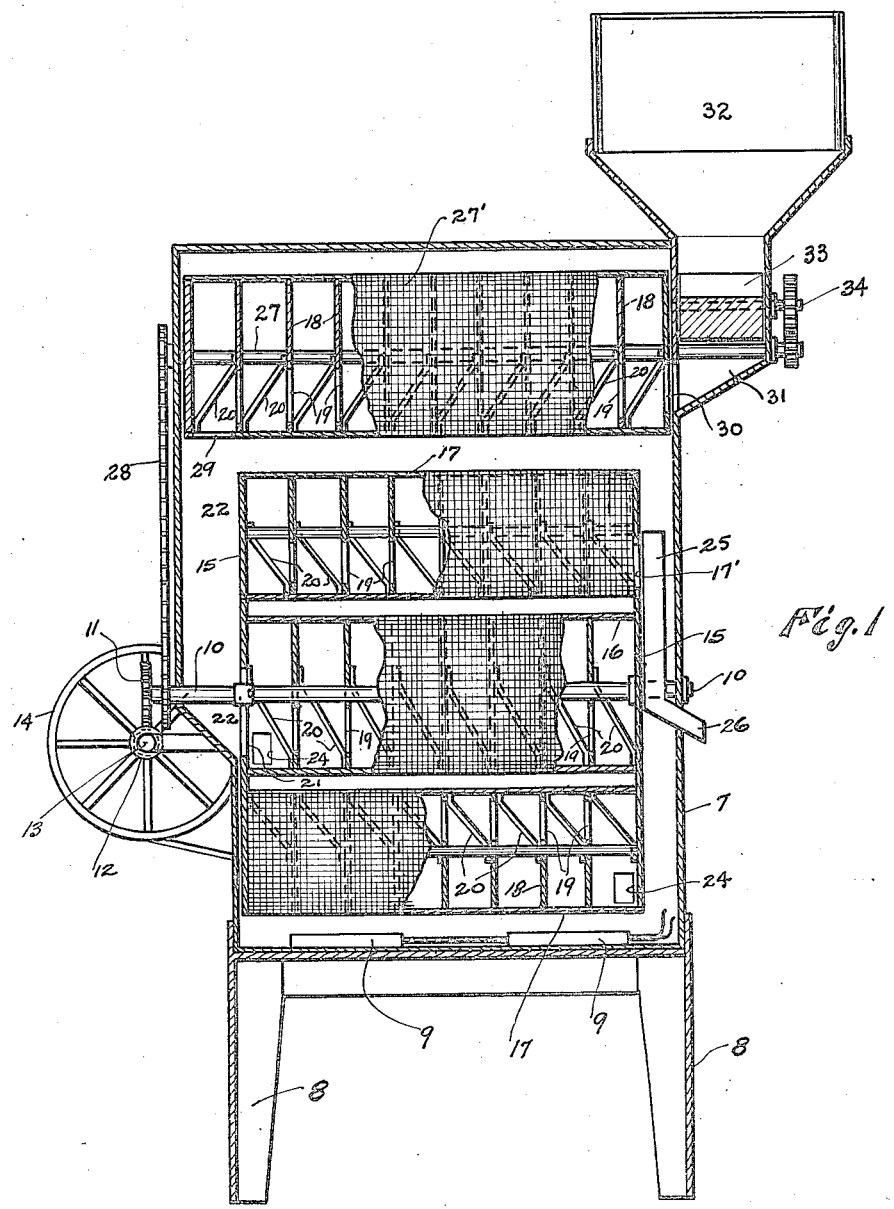

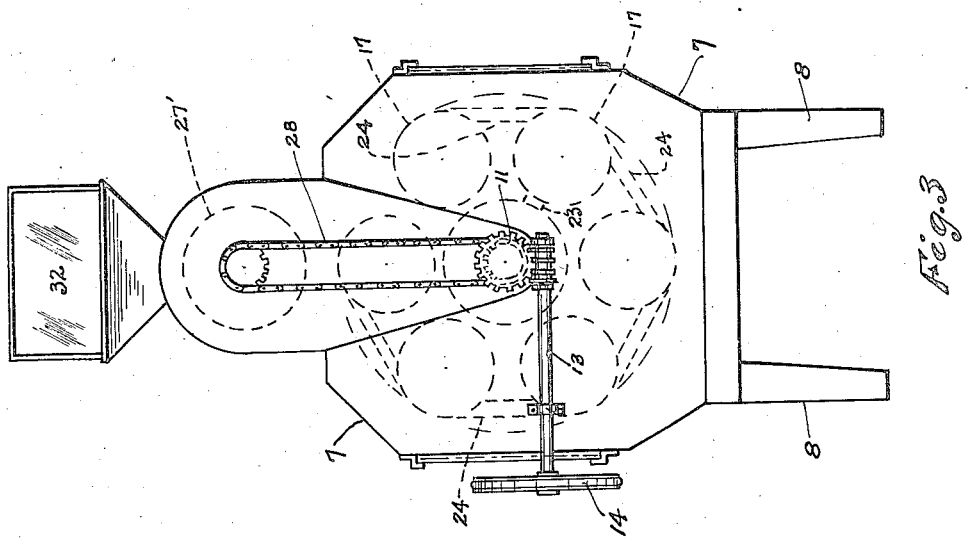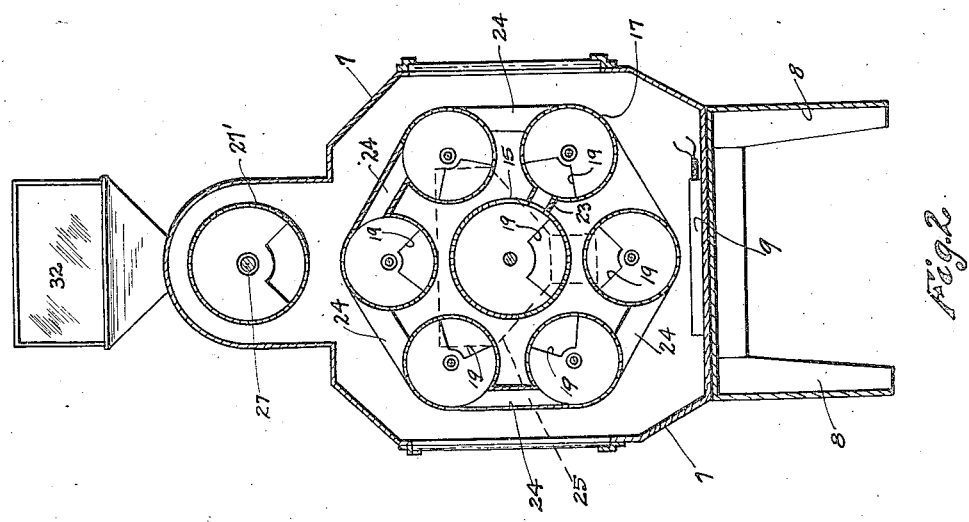

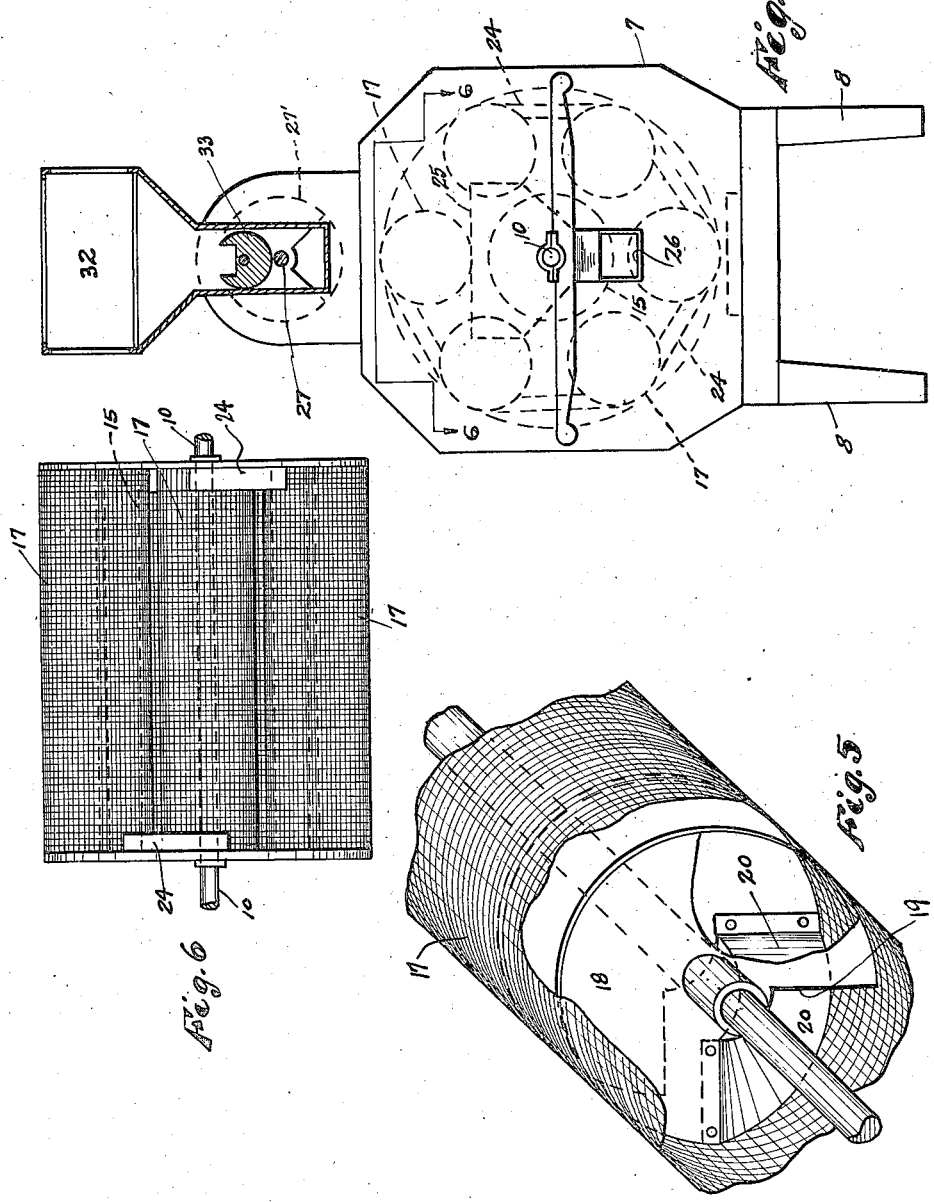

NATHANIEL B. POST, OF CHICAGO, ILLINOIS.

COFFEE ROASTER.

1,423,818.

Specification of Letters Patent. Patented July 25, 1922.

Application filed November 17, 1920, Serial No. 424,598. Renewed June 5, 1922. Serial No. 566,895.

*To all whom it may concern:*

Be it known that I, NATHANIEL B. POST, a citizen of the United States, and a resident of the city of Chicago, county of Cook, and State of Illinois, have invented certain new and useful Improvements in Coffee Roasters, of which the following is a specification.

My invention relates to improvements in coffee roasters and has for its object the provision of an improved construction of this character whereby coffee or the like may be quickly and efficiently roasted.

Other objects will appear hereinafter.

The invention consists in the combinations and arrangements of parts hereinafter described and claimed.

The invention will be best understood by reference to the accompanying drawings forming a part of this specification, and in which, Fig. 1, is a vertical longitudinal section of a machine embodying the invention, Fig. 2, a transverse section of the same, Fig. 3, an end view of the same, Fig. 4, an opposite end view of the machine showing parts in section, Fig. 5, an enlarged perspective view of a portion of one of a plurality of roasting chambers employed in the construction, and Fig. 6, a top plan view of the roasting chamber unit shown detached.

The preferred form of construction, as illustrated in the drawings, comprises a suitable casing 7 supported upon suitable legs or standards 8 and provided with suitable electrical heating units 9, as indicated. An operating shaft 10 is extended horizontally through the lower central portion of the casing 7 and is driven by means of a worm wheel 11 engaging a worm 12 on a drive shaft 13 driven by means of a pulley 14 and suitable belt.

Secured to the shaft 10, within the casing 7, are two end plates 15 in the form of sheet metal discs, and arranged between said end plates is a plurality of roasting chambers 16 and 17, the chamber 16 being mounted co-axially on shaft 10 and the chambers 17 being grouped about the chamber 16 so as to revolve therewith about the axis thereof. The roasting chambers 16 and 17 are cylindrical in form, and are formed of wire mesh material, and each of the chambers 17 has a central stiffening and supporting rod extending co-axially thereof and secured to the end plates 15, as shown. Each of the roasting chambers is divided into a number of transverse chambers or pockets by means of a plurality of partitions 18, each partition 18 being provided with a transfer opening 19 and with an inclined deflector 20, and whereby the material being roasted will be transferred from one pocket to another as the chambers revolve. The central chamber 16 is provided at one end with an entry opening 21 leading from the lower end of a vertical chute 22 formed in the casing 7 and adapted and arranged to deliver material to the corresponding end of said cylinder, the deflectors 20 therein being arranged to feed said material longitudinally through the chamber 16 as the same revolves. At its other end the chamber 16 is provided with a discharge passage 23 leading therefrom into the corresponding end of one of the chambers 17, and the deflectors 20 in that chamber 17 are arranged to feed the material being roasted longitudinally through that chamber 17 in a direction opposite to that of the feed of the material through chamber 16. The chambers 17 are alternately connected at their opposite ends by means of transfer chutes 24, arranged substantially tangentially to the arcs of revolution of the outer peripheries thereof and the deflectors in the chambers 17 are also alternately arranged in opposite directions so as to cause the material being roasted to be fed alternately and in opposite directions through the series of chambers 17, the tangential arrangement of the transfer chutes 24 facilitating such transfer as the chambers revolve. The last of the chambers 17 is provided with a discharge opening 17' in the corresponding end wall 15 leading to a discharge chute 25 in casing 10 and having a discharge spout 26 leading laterally through the corresponding end wall of casing 7, and whereby the roasted material is discharged from the machine.

Another shaft 27 is extended through the upper portion of the casing 7 parallel to shaft 10 and connected therewith by a suitable sprocket 28. A roasting chamber 27', similar in all respects to the roasting chambers 17, is mounted upon shaft 27 and provided with a peripheral discharge opening 29 arranged to discharge into the upper end of the chute 22. At its opposite end the chamber 27' is provided with an entry opening 30 communicating with a chute 31 leading from the feed hopper 32 and controlled by a notched feed wheel or drum 33 mounted on a shaft 34 geared to the shaft 27, as indicated, and whereby material to be roasted will be fed from hopper 32 into the chamber 27'.

In operation, the material to be roasted is supplied to the hopper 32 from which it is fed by means of the feed wheel 33 into the roasting chamber 27'. The material is fed longitudinally through the chamber 27' as the same revolves, and is discharged into the chute 22, from which it passes into the central roasting chamber 16 and through which it is fed in an opposite direction. From the central chamber 16, the material passes through the corresponding transfer chute 23, into the corresponding roasting chamber 17, and then passes, as has been previously indicated, successively and in opposite directions through the different roasting chambers 17, being finally discharged through the spout 26. During its passage through the various roasting chambers, the material will be constantly agitated and thoroughly and gradually and uniformly roasted, being discharged in roasted condition from the spout 26.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A roaster comprising a plurality of revolving roasting chambers grouped about the axis of revolution; means for feeding material through said chambers in opposite directions; transfer chutes connecting the alternate ends of said chambers and arranged substantially tangentially to the arcs of revolution of the outer peripheries thereof; and means for heating said chambers, substantially as described.

2. A roaster comprising a central roasting chamber; a plurality of roasting chambers grouped about said central chamber; means for feeding material through said central chamber and discharging it into one of said grouped chambers; means for feeding said material successively through said grouped chambers in opposite directions; and means for heating said chambers, substantially as described.

3. A roaster comprising a central roasting chamber; a plurality of roasting chambers grouped about said central chamber; means for revolving said chambers about the axis of said central chamber; means for feeding material through said central chamber and discharging it into one of said grouped chambers; means for feeding said material successively through said grouped chambers in opposite directions; and means for heating said chambers, substantially as described.

4. A roaster comprising a central roasting chamber; a plurality of roasting chambers grouped about said central chamber; means for feeding material through said central chamber and discharging it into one of said grouped chambers; means for feeding said material successively through said grouped chambers in opposite directions; transfer chutes connecting the alternate ends of said grouped chambers and arranged substantially tangentially to the arcs of revolution of the outer peripheries thereof; and means for heating said chambers, substantially as described.

5. A roaster comprising a central roasting chamber; a plurality of roasting chambers grouped about said central chamber; means for revolving said chambers about the axis of said central chamber; means for feeding material through said central chamber and discharging it into one of said grouped chambers; means for feeding said material successively through said grouped chambers in opposite directions; transfer chutes connecting the alternate ends of said grouped chambers and arranged substantially tangentially to the arcs of revolution of the outer peripheries thereof; and means for heating said chambers, substantially as described.

6. A roaster comprising a plurality of revolving roasting chambers provided with openings whereby the material is delivered from each chamber to the next successive chamber; a plurality of substantially transverse partitions in each of said chambers dividing the same into a plurality of chambers, each partition being provided with a transfer opening and an inclined deflector for transferring the material through each chamber in one direction and through successive chambers in opposite directions; and means for heating said chambers, substantially as described.

7. A roaster comprising a plurality of revolving roasting chambers grouped about the axis of revolution; a plurality of partitions in each chamber, each partition being provided with a transfer opening and an inclined deflector for feeding material through said chambers successively and in opposite directions; transfer chutes connecting the alternate ends of said chambers and arranged substantially tangentially to the arcs of revolution of the outer peripheries thereof; and means for heating said chambers, substantially as described.

8. A roaster comprising a central roasting chamber; a plurality of roasting chambers grouped about said central chamber; a plurality of partitions in each of said chambers, each partition being provided with a transfer opening and an inclined deflector for feeding material through said chambers in opposite directions; means for discharging the material from said central chamber into one of said grouped chambers; transfer chutes connecting the alternate ends of said grouped chambers and arranged substantially tangentially to the arcs of revolution of the outer peripheries thereof; and means for heating said chambers, substantially as described.

9. A roaster comprising a central roasting chamber; a plurality of roasting chambers grouped about said central chamber; means for revolving said chambers about the axis of said central chamber; a plurality of partitions in each of said chambers, each partition being provided with a transfer opening and an inclined deflector for feeding material through said chambers in opposite directions; means for discharging the material from said central chamber into one of said grouped chambers; transfer chutes connecting the alternate ends of said grouped chambers and arranged substantially tangentially to the arcs of revolution of the outer peripheries thereof; and means for heating said chambers, substantially as described.

10. In combination, a roasting chamber; a plurality of substantially transverse partitions in said chamber, dividing the same into a plurality of chambers, each of said substantially transverse partitions being provided with a transfer opening and an inclined deflector; and means for heating said chamber, substantially as described.

11. In combination, a roasting chamber having the periphery of foraminated material; a plurality of substantially transverse partitions in said chamber dividing the same into a plurality of chambers, each of said partitions being provided with a transfer opening and an inclined deflector; and means for heating said chamber, substantially as described.

In testimony whereof I have signed my name to this specification in the presence of two subscribing witnesses.

NATHANIEL B. POST.

Witnesses:
 JOSHUA R. H. POTTS,
 B. G. RICHARDS.